US008503726B2

(12) United States Patent
Ikenoue

(10) Patent No.: US 8,503,726 B2
(45) Date of Patent: Aug. 6, 2013

(54) IMAGE PROCESSING DEVICE, OBJECT TRACKING DEVICE, AND IMAGE PROCESSING METHOD

(75) Inventor: Shoichi Ikenoue, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 252 days.

(21) Appl. No.: 13/061,986

(22) PCT Filed: Jun. 30, 2009

(86) PCT No.: PCT/JP2009/003044
§ 371 (c)(1),
(2), (4) Date: May 12, 2011

(87) PCT Pub. No.: WO2010/026688
PCT Pub. Date: Mar. 11, 2010

(65) Prior Publication Data
US 2012/0114173 A1    May 10, 2012

(30) Foreign Application Priority Data
Sep. 4, 2008  (JP) .................................. 2008-227646

(51) Int. Cl.
*G06K 9/00* (2006.01)
*H04N 7/18* (2006.01)

(52) U.S. Cl.
USPC ........................... 382/103; 382/199; 348/155

(58) Field of Classification Search
USPC ................. 382/100, 103–109, 155, 162, 168, 382/172–173, 181, 190, 199, 209, 219, 232, 382/254, 274; 348/47, 155
See application file for complete search history.

(56) References Cited

U.S. PATENT DOCUMENTS

| | | | | |
|---|---|---|---|---|
| 7,020,307 B2 * | 3/2006 | Hinton et al. | ................ | 382/109 |
| 7,376,246 B2 * | 5/2008 | Shao et al. | ................... | 382/103 |
| 7,835,542 B2 * | 11/2010 | Lin et al. | ...................... | 382/103 |
| 7,940,957 B2 * | 5/2011 | Ikenoue et al. | ............... | 382/103 |
| 2008/0063236 A1 * | 3/2008 | Ikenoue et al. | ............... | 382/103 |

FOREIGN PATENT DOCUMENTS

| | | |
|---|---|---|
| JP | 7-193716 | 7/1995 |
| JP | 8-329254 | 12/1996 |
| JP | 9-138471 | 5/1997 |
| JP | 2001-52183 | 2/2001 |
| JP | 2004-265292 | 9/2004 |
| JP | 2007-328746 | 12/2007 |

OTHER PUBLICATIONS

International Search Report dated Jul. 28, 2009, from corresponding International Application No. PCT/JP2009/003044.
International Preliminary Report on Patentability and Written Opinion of the International Searching Authority dated Apr. 12, 2011, from the corresponding International Application No. PCT/JP2009/003044.

(Continued)

*Primary Examiner* — Seyed Azarian
(74) *Attorney, Agent, or Firm* — Katten Muchin Rosenman LLP

(57) ABSTRACT

An edge extracting unit of a contour image generator generates an edge image of an input image using an edge extraction filter, etc. A foreground processing unit extracts the foreground from the input image using a background image and expands the foreground to generate an expanded foreground image. The foreground processing unit further generates a foreground boundary image constructed of the boundary of the expanded foreground region. A mask unit masks the edge image using the expanded foreground image to eliminate edges in the background. A synthesis unit synthesizes the masked edge image and the foreground boundary image to generate a contour image.

13 Claims, 15 Drawing Sheets

(56) References Cited

OTHER PUBLICATIONS

Michael Isard et al. "Contour tracking by stochastic propagation of conditional density" In Proc. European Conf. Computer Vision, vol. 1, 1996, pp. 343-356.

Michael Isard et al. "ICONDENSATION: Unifying low-level and high-level tracking in a stochastic framework" Proc 5th European Conf. Computer Vision, 1998.

Notification of Reason(s) for Refusal dated Feb. 19, 2013, from the corresponding Japanese Patent Application No. 2008-227646, with English Translation.

\* cited by examiner

62a

64a 86   82   84

88  89

IMAGE PROCESSING DEVICE, OBJECT TRACKING DEVICE, AND IMAGE PROCESSING METHOD

TECHNICAL FIELD

The present invention relates to information processing techniques, and in particular to an object tracking apparatus for tracking a target object in an input image and an object tracking method performed therein.

BACKGROUND ART

With the advancements in image processing technologies and information processing apparatuses, there have been proposed various techniques for generating images and techniques using image analysis. In particular, a technique for extracting the contour of an object is a key technique in a wide range of fields, including visual tracking, computer vision, medical image analysis, and retouching. Since the contour of an object in an image can be regarded as part of edges, an edge extraction filter is often used for the extraction of contours. For example, in the Condensation (Conditional Density Propagation) algorithm for visual tracking techniques, a finite number of particles are used to provide an existence probability distribution of a tracking object, and matching is performed between a candidate contour, which is specified by a particle and has the same shape as the tracking object, and an edge image so as to observe the likelihood of each particle and estimate the existence probability distribution of the next frame (see Non-Patent Literature 1 or 2, for example).

Meanwhile, as a technique for extracting a contour, there have also been proposed active contour models (Snakes) with which a contour model of an object is represented by a closed curve, and such a closed curve is changed so that a predefined energy function becomes minimum, thereby estimating the contour of the object (see Patent Literature 1 or 2).

CITATION LIST

Non Patent Literature

[Non-Patent Literature 1] Contour tracking by stochastic propagation of conditional density, Michael Isard and Andrew Blake, Proc. European Conf. on Computer Vision, vol. 1, pp. 343-356, Cambridge UK (1996)

[Non-Patent Literature 2] ICondensation: Unifying low-level and high-level tracking in a stochastic framework, Michael Isard and Andrew Blake, Proc 5th European Conf. Computer Vision, 1998

Patent Literature

[Patent Literature 1] Japanese Patent Application Laid-open No. 9-138471

[Patent Literature 2] Japanese Patent Application Laid-open No. 8-329254

SUMMARY OF INVENTION

Technical Problems

With a general edge extraction filter, there often occurs a problem in that minute shadows or designs other than the contour are extracted or a problem in that the contour is broken or cannot be extracted, depending on the shooting conditions or set parameters. This is because, with an edge extraction filter, since a pixel representing an edge is determined by a threshold with respect to an intermediate value obtained through filtering, the edge extraction frequency on the whole screen may vary depending on the setting of the threshold, so that extracting only the contour is sometimes difficult. Also, the active contour models have problems in that initial settings for a contour model are required with respect to each object and that the final result is affected by the initial settings. Further, in the case where the contour of an object in a moving image is sequentially acquired, as seen in the visual tracking technique mentioned previously, there is a problem in that a change in the shape of the object may not be followed because the amount of calculation is large.

The present invention has been made in view of such problems, and a purpose thereof is to provide a technique for certainly extracting the contour of an object in any image.

Solution to Problems

One aspect of the present invention relates to an image processing apparatus. The image processing apparatus generates a contour image in which the contour of an object included in an input image is emphasized, and the image processing apparatus comprises: an edge extracting unit configured to extract edges from an input image to generate an edge image; a foreground processing unit configured to acquire a difference in background of an input image using a background image registered in advance and to extract a foreground including an object; a mask unit configured to generate a masked edge image obtained by eliminating, from an edge image generated by the edge extracting unit, edges in a region other than a foreground region specified by a foreground extracted by the foreground processing unit; a synthesis unit configured to synthesize the masked edge image generated by the mask unit and a foreground boundary image constructed of the boundary of a foreground region specified by a foreground extracted by the foreground processing unit so as to generate the contour image; and an output unit configured to output a contour image.

The "foreground region specified by an extracted foreground" is a region determined based on an extracted foreground, such as the region of the extracted foreground itself, a region obtained by expanding the extracted foreground, and a region obtained by shrinking the extracted foreground, and is a region regarded as a foreground, which may be different in size by about several pixels from the actual extracted foreground.

Another aspect of the present invention relates to an object tracking apparatus. The object tracking apparatus comprises: a candidate contour determining unit configured to determine a candidate contour of an object to be tracked in a second image frame on the basis of an estimated existence probability distribution of the object in a first image frame, in which the first image frame and the second image frame are included in an image stream constituting the data of a moving image including the object to be tracked; an observing unit configured to observe the likelihood of a candidate contour determined by the candidate contour determining unit by performing matching between the candidate contour and a contour image of the second image frame output by the aforementioned image processing apparatus; and a tracking result acquiring unit configured to estimate the existence probability distribution of the object in the second image frame on the basis of the likelihood observed by the observing unit.

The "first image frame" and the "second image frame" may be frames adjacent to each other or those located separately away from each other in an image stream. In general object tracking in the forward direction of the time axis, the "first image frame" is a frame before the "second image frame" in terms of time, but the present embodiment is not limited thereto.

The "existence probability distribution" may be an existence probability distribution in the position coordinates within an image frame of a target object or an existence probability distribution in a space specified by parameters representing any of attributes of the target object, such as shape, color, and size, or a combination thereof. The "candidate contour" is a figure that represents a candidate of the contour of the target object in part or whole. The "likelihood" represents a degree to which a candidate contour is similar to the object. For example, such a degree includes a numerical value representing the degree of overlap between the candidate contour and the object, and a numerical value representing the distance from the object.

Yet another aspect of the present invention relates to an image processing method. According to the image processing method, a computer generates a contour image in which the contour of an object included in an input image is emphasized, and the image processing method comprises: reading an input image stored in memory and extracting one or more edges from the input image; reading a background image stored in memory and acquiring a difference in background of the input image to extract a foreground including an object; and outputting, as the contour image, an image including at least part of the extracted edges and the boundary of a foreground region specified by an extracted foreground.

Optional combinations of the aforementioned constituting elements, and implementations of the invention in the form of methods, apparatuses, systems, and computer programs may also be practiced as additional modes of the present invention.

Advantageous Effects of Invention

The present invention enables stable extraction of the contour of an object in an image.

DESCRIPTION OF EMBODIMENT(S)

Figure 1:
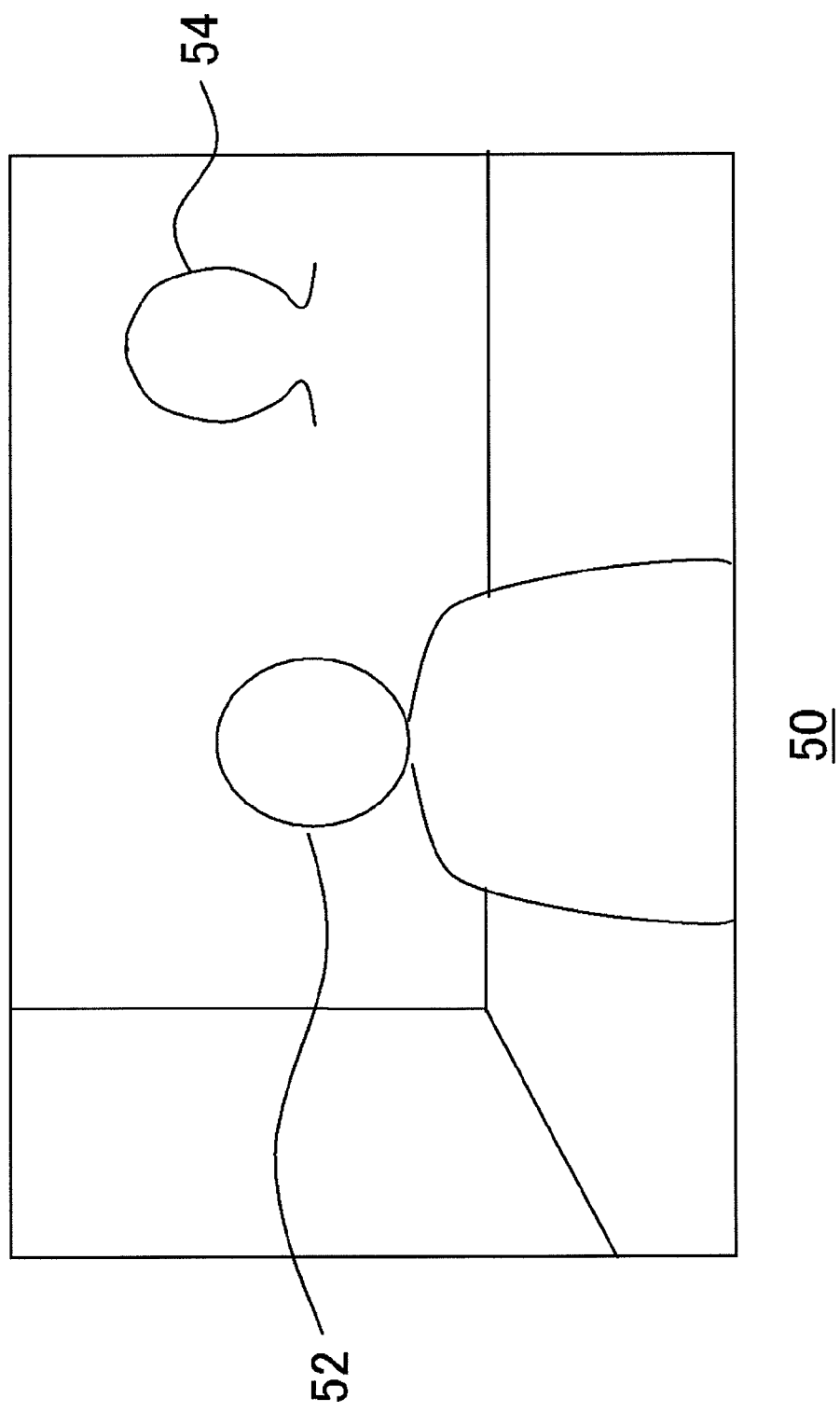
FIG. 1 is a diagram for describing a visual tracking method where a person is an object to be tracked.

First, visual tracking using a particle filter will be described to clarify the features and effects of the present embodiment. FIG. 1 is a diagram for describing a visual tracking method where a person is an object to be tracked (tracking object). A person image 50 is one of image frames constituting an image stream of a moving image, such as a live-action moving image or a moving image generated using computer graphics or the like, and an image of a person 52 is captured therein as a tracking object.

In order to track the motion of the person 52, an omega-shaped curve 54 that approximates the shape of the head contour of the person 52 is described by a known representation. Meanwhile, the person image 50 including the person 52 is subjected to edge extraction processing and an edge image thereof is obtained. Thereafter, the shape and the position of the curve 54 are modified by changing the parameters defining the curve 54 so as to detect an edge near the curve 54, thereby identifying the value of a parameter that is presumed to best match the head contour of the person 52. By repeating the processing described above for each frame, the tracking of the person 52 will proceed. An edge is generally defined to be a position at which the density or color drastically changes in an image.

In order to perform matching between various types of curves 54 and head contours of persons 52, a probability distribution prediction technique using a particle filter is employed. Namely, the number of sampling in a curve 54 is increased or decreased according to the probability distribution of the target object on parameter space in the previous frame, thereby narrowing down the candidates to be tracked. Accordingly, an area with higher existence probability can be intensively searched, enabling efficient matching with high accuracy.

A method for the application of a particle filter to tracking in which the contour of a target object is focused on is detailed in Non-Patent Literature 2 (ICondensation: Unifying low-level and high-level tracking in a stochastic framework, Michael Isard and Andrew Blake, Proc 5th European Conf. Computer Vision, 1998), for example. In the following, a description will be given with attention focused on the features relative to the present embodiment.

The omega-shaped curve 54 is described by a B-spline curve. The B-spline curve is defined by a control point sequence of n control points (Q0, ... , Qn) and a knot sequence of n knot values (s0, ... , sn). These parameters are preset to draw a basic curved shape, namely an omega-shaped curve in this case. The curve obtained with such preset parameters is hereinbelow called a "template $Q_0$". Although the shape of the template $Q_0$ is an omega shape when the person 52 in the person image 50 of FIG. 1 is to be tracked, the shape is varied depending on the target object. For example, the shape will be a circular shape if the target object is a ball, and the shape will be a palm shape if the target object is a palm.

Next, a shape-space vector x is prepared as a transformation parameter used to change the shape of the template. The shape-space vector x is defined by six parameters as follows.

[Math. 1]

$$x = (\text{shift}_x, \text{shift}_y, \text{extend}_x \cos\theta - 1, \text{extend}_y \cos\theta - 1, -\text{extend}_x \sin\theta, \text{extend}_y \sin\theta)^T \quad \text{(Formula 1)}$$

In Formula 1, $\text{shift}_x$ and $\text{shift}_y$ are translation amounts in x and y directions, respectively, $\text{extend}_x$ and $\text{extend}_y$ are magnifications, and $\theta$ is a rotation angle. Using an operational matrix W with which the shape-space vector x is applied to the template $Q_0$, a curve obtained after transformation, i.e., a candidate curve Q, is described as follows.

[Math. 2]

$$Q = Wx + Q_0, \quad W = \begin{pmatrix} 1 & 0 & Q_0^x & 0 & 0 & Q_0^y \\ 0 & 1 & 0 & Q_0^y & Q_0^x & 0 \end{pmatrix} \quad \text{(Formula 2)}$$

Using Formula 2, the template can be translated, expanded or contracted, and rotated by appropriately varying the six parameters constituting the shape-space vector x, and combinations of such operations allow various changes of the shape and position of the candidate curve Q.

With respect to each of multiple candidate curves obtained by changing the parameters of the template $Q_0$, such as the control point sequence and the interval of the knot sequence, or the six parameters constituting the shape-space vector x, an edge of the person 52 lying close to each knot is searched for. Thereafter, the likelihood of each candidate curve is calculated based on the distance from an edge, etc. so as to estimate the probability density distribution in a six-dimensional space of the six parameters constituting the shape-space vector x.

Figure 2:
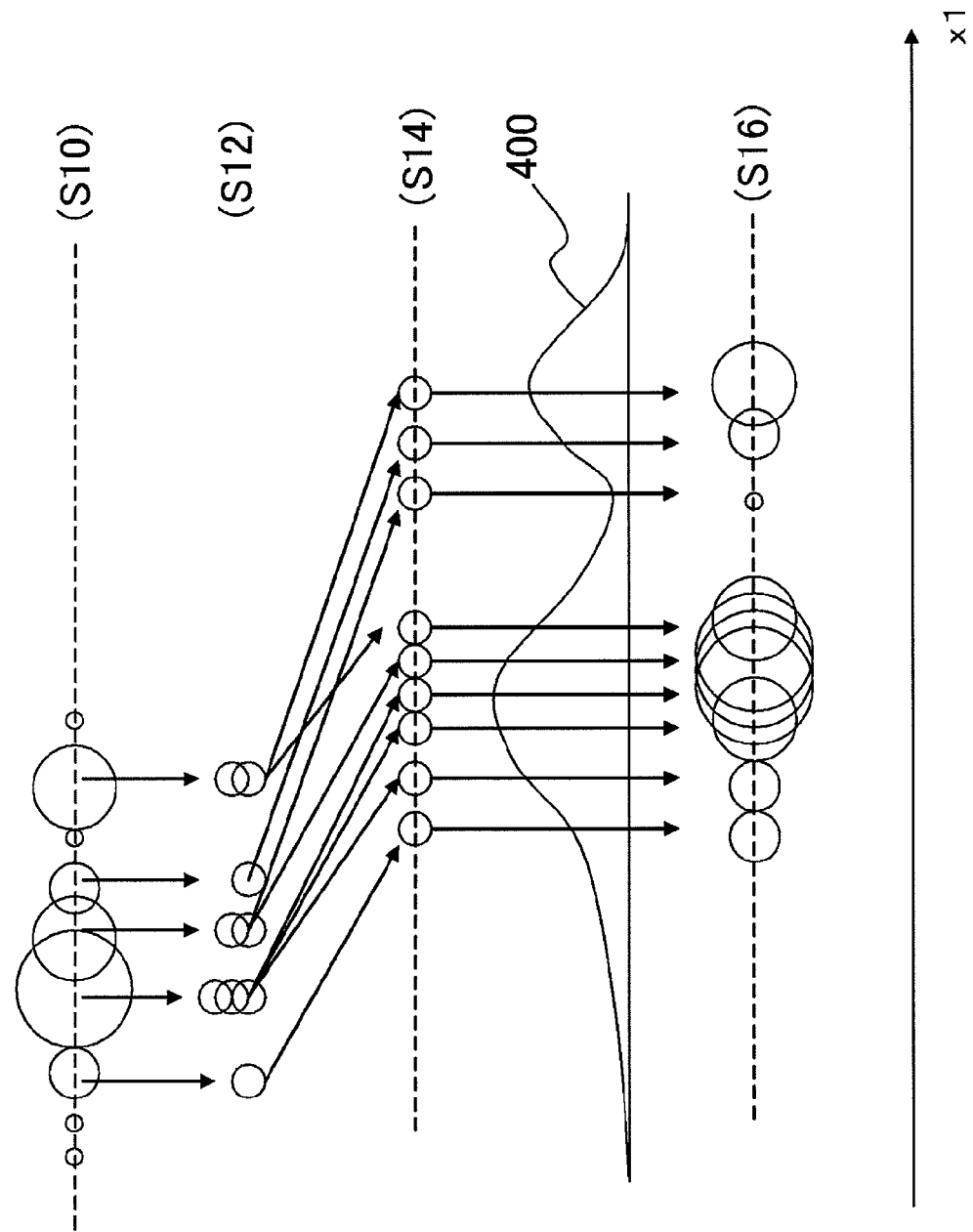
FIG. 2 is a diagram for describing a method for estimating probability density using a particle filter.

FIG. 2 is a diagram for describing a method for estimating a probability density distribution using a particle filter. Although the horizontal axis in FIG. 2 shows changes of a parameter x1 among the six parameters constituting the shape-space vector x for ease of understanding, the same processing is actually performed in the six-dimensional space. It is assumed here that the image frame for which the probability density distribution is to be estimated is an image frame at time t.

First, using the probability density distribution on the axis of the parameter x1 estimated for the image frame at time t−1, which is the previous frame of the image frame at time t, (S10), particles at time t are generated (S12). If filtering has been performed so far and particles are already provided, the division or elimination of the particles will be considered. The probability density distribution provided in S10 is discretely calculated in accordance with the coordinates on the parameter space, and it is indicated in a manner such that the larger the circle, the higher the probability density will be.

A particle substantially shows the value of the parameter x1 to be sampled and the sampling density. For example, a region where the probability density for the parameter x1 at time t−1 is high is represented by particles with high density so that the region will be intensively sampled. On the other hand, a region where the probability density is low is represented by a reduced number of particles so that the region will not be sampled so much. Accordingly, a large number of candidate curves can be generated near edges of the person 52, for example, thereby enabling efficient matching.

Next, particles are made to transit on the parameter space using a predetermined motion model (S14). The predetermined motion model includes a Gaussian motion model and an autoregression prediction motion model, for instance. The former is a model assuming that a probability density at time t shows a Gaussian distribution around each probability density at time t−1. The latter is a method of assuming an autoregression prediction model, of which the degree is two or above, obtained from sample data. For example, the fact that the person 52 moves at a constant speed is presumed based on variation of parameters in the past. In the example of FIG. 2, a motion in the positive direction of parameter x1 is estimated through the autoregression prediction motion model, and each particle is made to transit accordingly.

Thereafter, edges of the person 52 in the vicinity of candidate curves determined by the respective particles are searched for using an edge image at time t so as to calculate the likelihood of each candidate curve, thereby estimating the probability density distribution at time t (S16). As described previously, the estimated probability density distribution discretely shows the true probability density distribution 400, as shown in S16. By repeating the above-described steps thereafter, the probability density distribution at each time is provided in the parameter space. For example, if the probability density distribution is unimodal, i.e., if there is only one tracking object, an estimated contour of the tracking object will be obtained by assigning weights to parameter values using the calculated probability densities and specifying the sum of such weighted parameter values as the final parameter.

The probability density distribution $p(x_t^i)$ at time t estimated in S16 is calculated as follows.

[Math. 3]

$$p(\hat{x}_t^i) = \eta p(y_t|\hat{x}_t^i) \int p(\hat{x}_t^i|\hat{x}_{t-1}^i, u_{t-1}) p(\hat{x}_{t-1}^i) d\hat{x}_{t-1}^i \quad \text{(Formula 3)}$$

In Formula 3, i is a number uniquely assigned to a particle, $p(x_t^i|x_t^i, u_{t-1})$ is a predetermined motion model, and $p(y_t|x_t^i)$ is likelihood.

Figure 3:
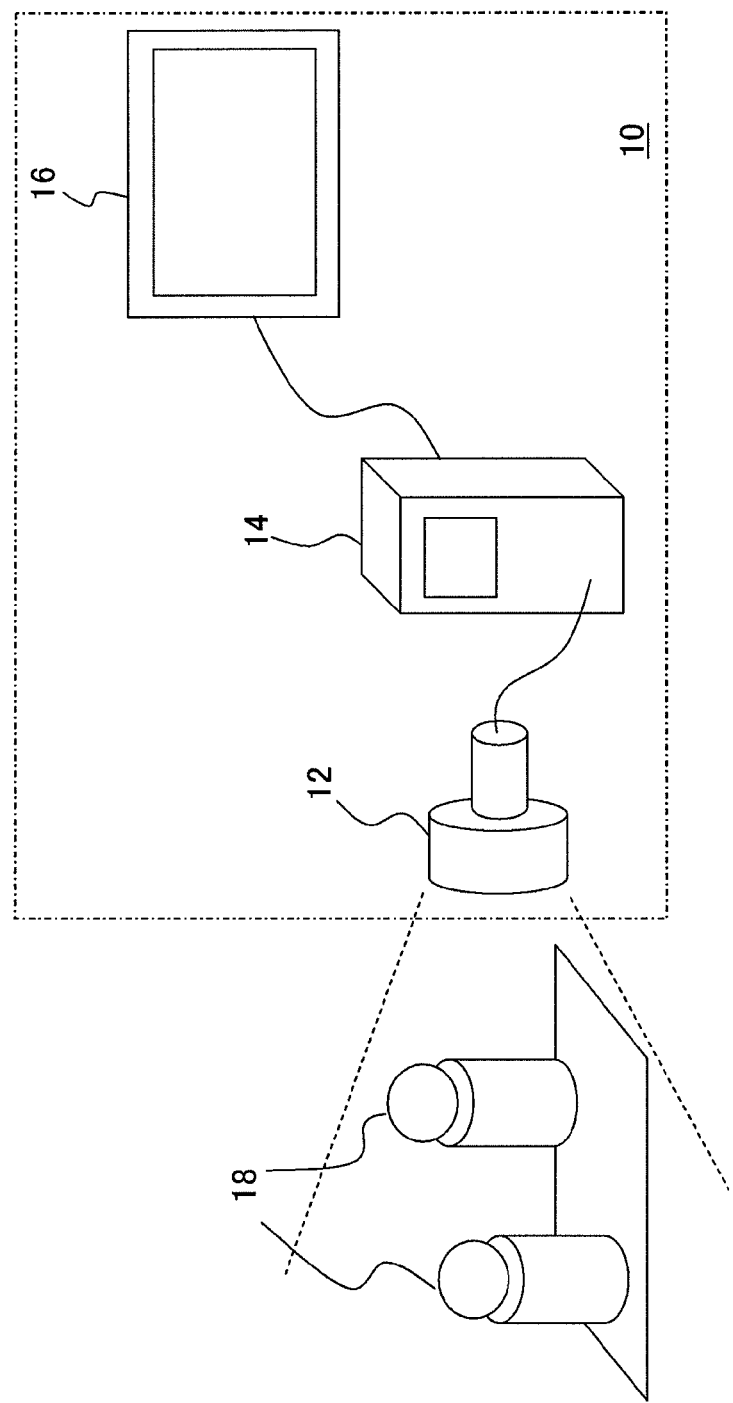
FIG. 3 is a diagram that shows an illustrative configuration of a visual tracking system according to the present embodiment.

FIG. 3 shows an illustrative configuration of a visual tracking system according to the present embodiment.

A visual tracking system 10 includes an image pickup apparatus 12 for capturing an image of a tracking object 18, a tracking apparatus 14 for performing a tracking process, and a display apparatus 16 for outputting data of an image captured by the image pickup apparatus 12 and tracking result data. The tracking object 18 may be a person, an object, or part thereof and may be different depending on the use purpose of the visual tracking system 10. In the following description, however, the tracking object 18 is defined to be a person as with the aforementioned example.

The tracking apparatus 14 may be connected to the image pickup apparatus 12 and display apparatus 16 by wired or wireless means and may be connected thereto via networks. Also, any two of or all of the image pickup apparatus 12, tracking apparatus 14, and display apparatus 16 may be combined together and integrally provided. Depending on the use environment, the image pickup apparatus 12 and display apparatus 16 do not have to be connected to the tracking apparatus 14 at the same time.

The image pickup apparatus 12 acquires the data of an image including the tracking object 18 or the data of an image of a certain spot regardless of the existence of the tracking object 18 at a predetermined frame rate. The image data thus acquired is input to the tracking apparatus 14 where the tracking process for the tracking object 18 is performed. The processing result is output as output data to the display apparatus 16 under the control of the tracking apparatus 14. The tracking apparatus 14 may also serve as a computer for performing other functions, so as to achieve various functions using the data obtained through the tracking process, such as position information and shape information of the tracking object 18.

Figure 4:
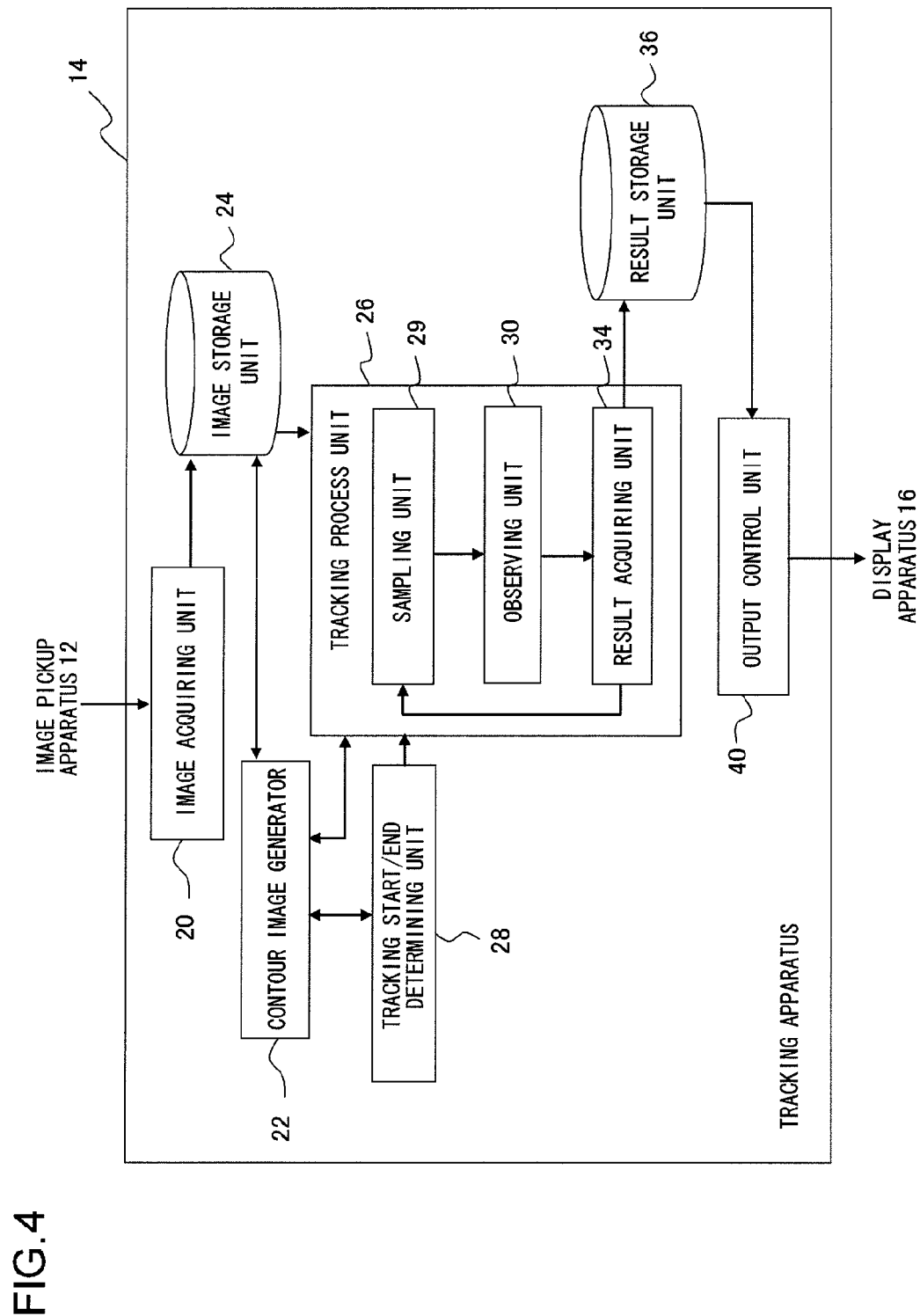
FIG. 4 is a diagram that shows a detailed configuration of a tracking apparatus according to the present embodiment.

FIG. 4 shows a detailed configuration of the tracking apparatus 14 according to the present embodiment. The tracking apparatus 14 includes an image acquiring unit 20 for acquiring input image data input from the image pickup apparatus 12, an image storage unit 24 for storing the input image data or contour image data, a contour image generator 22 for generating a contour image from input image data, a tracking start/end determining unit 28 for determining the start and end of tracking, a tracking process unit 26 for performing a tracking process using a particle filter, a result storage unit 36 for storing final tracking result data, and an output control unit 40 for controlling the output of a tracking result to the display apparatus 16.

Each of the elements represented by functional blocks for performing various processes shown in FIG. 4 can be implemented by a CPU, memory, an LSI or the like in terms of hardware, and by a program for performing image processing or the like in terms of software. Accordingly, it will be obvious to those skilled in the art that these functional blocks may be implemented in a variety of forms by hardware only, software only, or a combination thereof, and the form is not limited to any of them.

The contour image generator 22 extracts the contour of a tracking object from an image frame of an input image to generate a contour image. The contour image is stored in the image storage unit 24 and will be used later by an observing unit 30 of the tracking process unit 26 for the observation of the likelihood of a candidate curve. Since the "contour" is generally regarded as "edges" in an edge image, the likelihood is observed using the "edge image" in a conventional technique. However, depending on the input image, many edges other than the contour of an object could be extracted therefrom with a general edge extraction filter. Accordingly, it is speculated that the likelihood may not be accurately observed because of matching with edges other than the contour.

Therefore, the contour image generator 22 of the present embodiment generates an image with which the likelihood can be accurately observed, instead of a general "edge image", particularly focusing on the "contour" of an object in an input image. Although the specific method will be described later, an image generated by the contour image generator 22 will be referred to as a "contour image" in the following description to be differentiated from a general "edge image".

The tracking start/end determining unit 28 evaluates the shape of a contour acquired by the contour image generator 22, for example, and determines whether to start or terminate tracking according to a predetermined condition. The "termination" of tracking may include a temporary stop due to occlusion or the like. For example, tracking may start when the tracking object enters the viewing angle of the image pickup apparatus or appears from behind something, and tracking may terminate when the tracking object leaves the viewing angle of the image pickup apparatus or gets behind something. When determining the start of tracking, the tracking start/end determining unit 28 notifies the tracking process unit 26 thereof to allow the unit 26 to start the tracking process.

The tracking process unit 26 includes a sampling unit 29, an observing unit 30, and a result acquiring unit 34. The sampling unit 29 generates or eliminates particles based on the probability density distribution estimated for the previous image frame at time t−1 and applies a motion model to all the particles so as to make the particles to transit on the parameter space. The sampling unit 29 starts the processing upon receipt of a signal indicating the start of tracking from the tracking start/end determining unit 28, and terminates the processing upon receipt of a signal indicating the termination of tracking. The observing unit 30 observes the likelihood of a candidate curve defined by each particle.

The result acquiring unit 34 calculates the probability density distribution $p(x_t^i)$ as given by Formula 3 based on the likelihood observed by the observing unit 30. Thereafter, the result acquiring unit 34 calculates a tracking result, such as estimated contour data of the tracking object, using parameters that have been subjected to weighted averaging using the calculated probability density distribution, and stores the tracking result in the result storage unit 36. The result acquiring unit 34 also transmits the data to the sampling unit 29 so that the data will be used in the next tracking process at time t+1. The data stored in the result storage unit 36 may be the value of each parameter which has been subjected to weighted averaging, the data of an image that only includes an estimated contour determined by such parameter values, or data of an image obtained by synthesizing the estimated contour and the input image.

If there are multiple tracking objects, the result acquiring unit 34 may combine the results of tracking processes for the respective tracking objects performed using templates prepared therefor, thereby providing a single tracking result. The result acquiring unit 34 also detects from the tracking result the case where multiple tracking objects overlap with each other and takes appropriate measures, such as excluding a tracking object hidden behind another object from the tracking targets at certain timing. Accordingly, the output of an inappropriate tracking result can be prevented even when the observed likelihood is temporarily reduced because a tracking object gets behind another tracking object.

When the contour image generator 22 and tracking process unit 26 perform the above-described processing on each frame, moving image data including a tracking result, for example, is stored in the result storage unit 36. In such a case, by outputting the moving image data to the display apparatus 16 under the control of the output control unit 40, the state where the curve of the template moves in the same way as the tracking object can be displayed. Besides being displayed as a moving image as described above, the tracking result may be appropriately subjected to another processing, such as being output to another operation module according to the purpose of the tracking.

There will now be described the operation of the tracking apparatus 14 performing a tracking process. As an example, a case of tracking a person in a certain place will be described. The image pickup apparatus 12 captures images of the subject place at a predetermined frame rate. A captured image is input to the image acquiring unit 20 of the tracking apparatus 14 as input image data and stored in the image storage unit 24. In such a condition, a tracking process will be performed as described below.

Figure 5:
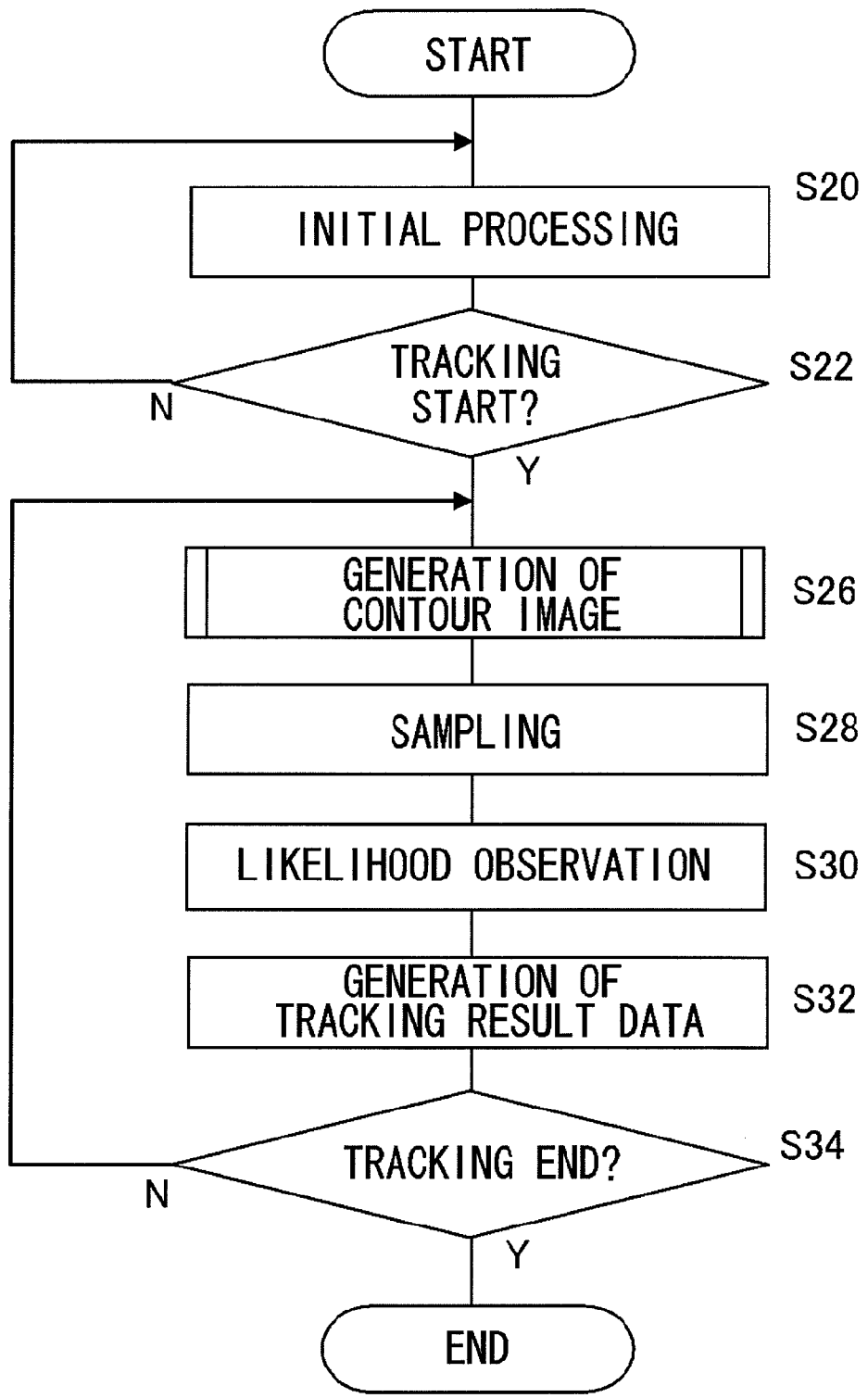
FIG. 5 is a flowchart that shows the procedure of a tracking process in the present embodiment.

FIG. 5 is a flowchart that shows the procedure of a tracking process in the present embodiment. Since the tracking object is a person in this example, an omega-shaped template is prepared in the tracking apparatus 14 as described previously. The representation method for the template is not limited to the B-spline curve and may be any other description form with which a desired curve can be provided. Also, as the method for transforming the template shape may be selected a method that is suitable for the description form and with which flexible transformation as described previously is enabled by varying several kinds of parameters.

First, the tracking start/end determining unit 28 determines whether or not to start tracking based on the input image stored in the image storage unit 24 (S20 and S22). For example, if the tracking start/end determining unit 28 acquires a foreground extracted by the contour image generator 22 through foreground extraction processing, which will be described later, and if the foreground appears to be an object having a certain size and shape estimated to be a person, the tracking start/end determining unit 28 will determine the start of tracking. The size and shape of the foreground serving as determination criteria are theoretically or experimentally specified in advance. Alternatively, the tracking start/end determining unit 28 may be provided with a foreground extractor.

The steps S20 and S22 are repeated until the start of tracking is determined. If the start of tracking is determined (Y at S22), the tracking process unit 26 will start the tracking process using a contour image generated by the contour image generator 22. It is assumed here that the time corresponding to the image frame for which the tracking is determined to be started is defined as t=0, and the subsequent image frames correspond to the times t=1, 2, 3, . . . , respectively. First, the contour image generator 22 generates a contour image of the image frame at t=0 using a method described later (S26).

Subsequently, the sampling unit 29 performs sampling by arranging particles equally in a predetermined region of the parameter space, for example, the observing unit 30 performs matching between a candidate curve defined by each particle and the contour image to observe the likelihood of the candidate curve, and the result acquiring unit 34 calculates the initial value $p(x_0^i)$ of the probability density distribution according to Formula 3 (S28, S30, and S32).

Meanwhile, the contour image generator 22 reads from the image storage unit 24 the image frame at time t=1 and generates a contour image (N at S34 and S26). The sampling unit 29 then generates, on the parameter space, particles of which the number corresponds to the initial value $p(x_0^i)$ of the generated probability density distribution and performs sampling by making the particles to transit based on a predetermined motion model (S28). The number of particles to be generated is controlled in consideration of processing load based on the amount of operation resources available in the tracking apparatus 14 or the required rate of result output. The motion model is determined beforehand by selecting an appropriate model from among the Gaussian motion model, the autoregression prediction motion model, and the like, according to the type of the tracking object so as to enable tracking with high accuracy.

The observing unit 30 observes the likelihood $p(y_t|x_t^i)$ of each candidate curve defined by each particle after transition (S30). The likelihood is observed by searching for a contour near each candidate curve using the contour image at time t=1 generated by the contour image generator 22.

Thereafter, the result acquiring unit 34 calculates the probability density distribution $p(x_1^i)$ at time t=1 based on the observed likelihood. If there are multiple tracking objects, the above-described processing will be performed on all the tracking objects. The result acquiring unit 34 then obtains an omega-shaped curve by subjecting the parameters to weighted averaging using the probability density distribution $p(x_1^i)$ and finally determines the omega-shaped curve as the shape and position of the tracking object at time t=1. Subsequently, the result acquiring unit 34 generates desired tracking result data, such as the data of the image frame in which the omega-shaped curve is superimposed on the original input image frame, and stores such result data in the result storage unit (S32).

The tracking start/end determining unit 28 determines whether to further continue or terminate the tracking process (S34). For example, when an object having a predetermined size and shape estimated to be a person does not appear as the foreground for a predetermined period of time, the tracking start/end determining unit 28 determines the termination of the tracking. The tracking start/end determining unit 28 also determines the termination of the tracking when the occlusion state, such as when a tracking object gets behind another tracking object on the real space, continues for a predetermined period of time. The occlusion state may be deduced from tracking results in the past or may be detected by a distance measuring system or the like, which is not illustrated. Further, when the tracking object continues to be out of the viewing angle of the image pickup apparatus 12 for a predetermined period of time, such state will also be detected using the same technique as used in the detection of the occlusion state, and the tracking start/end determining unit 28 determines the termination of the tracking.

If it is determined that the tracking process is not terminated at S34 (N at S34), a contour image will be generated from the image frame at time t=2, the particles will be generated or eliminated using the probability density distribution $p(x_1^i)$ at time t=1 obtained at S32, the particles will be made to transit using a motion model, the likelihood with respect to the frame at time t=2 will be observed, and the probability density distribution will be calculated (S26-S32). Thereafter, the processing of S26 through S32 will be repeated for each frame until the tracking start/end determining unit 28 determines the termination of the tracking at S34 (Y at S34). As a result, the data of a moving image in which an omega-shaped curve having the same shape as the head of a visitor (tracking object) changes with time in the same way as the visitor's head moves will be stored in the result storage unit 36. By allowing the output control unit 40 to output such data to the display apparatus 16 or a module providing other functions, the user can use the tracking result in a desired form.

Figure 6:
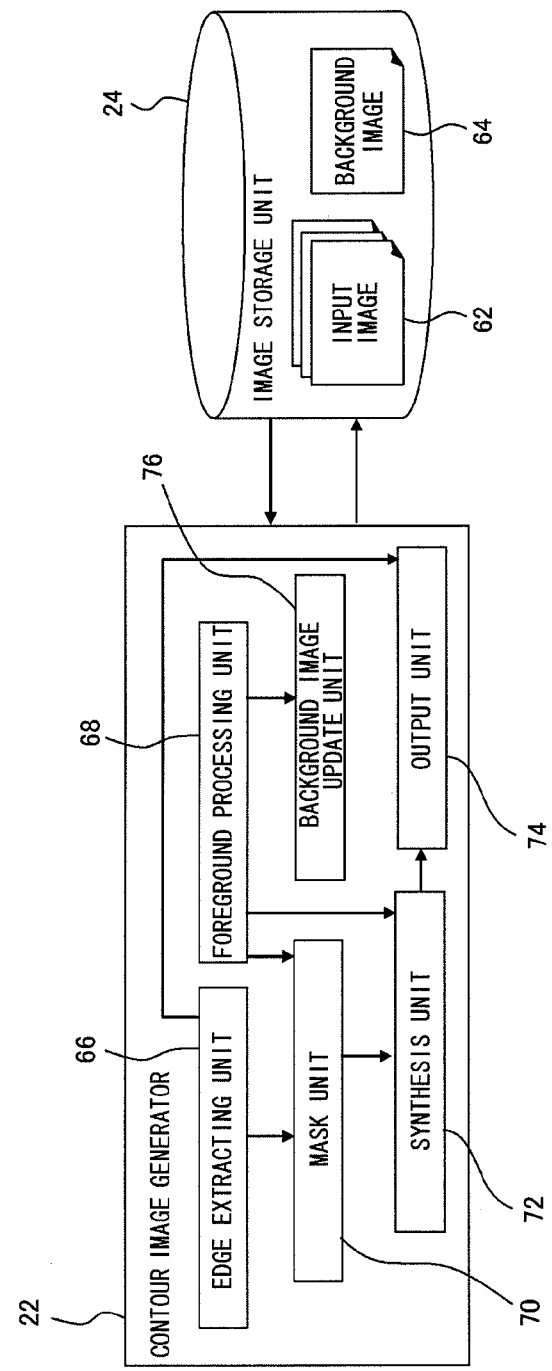
FIG. 6 is a diagram that shows a detailed configuration of a contour image generator in the present embodiment.

Next, processing for generating a contour image performed by the contour image generator 22 will be described. FIG. 6 shows a detailed configuration of the contour image generator 22. The contour image generator 22 includes an edge extracting unit 66, a foreground processing unit 68, a mask unit 70, a synthesis unit 72, an output unit 74, and a background image update unit 76. The contour image generator 22 generates a contour image using an input image 62 and a background image 64 stored in the image storage unit 24. In the present embodiment, foreground extraction processing using background subtraction is performed in addition to general edge extraction processing, so as to generate a contour image that certainly includes the contour of the tracking object.

According to the present embodiment, the contour of a tracking object can be stably acquired even when the content of the image changes because of a change of the shooting conditions, etc. Also, in the resulting contour image, lines other than the contour of the tracking object are eliminated as much as possible and the contour is emphatically indicated.

In the image storage unit 24 are stored an input image 62 including a tracking object and a background image 64, which are to be used by the contour image generator 22. The input image 62 is an image frame of a moving image including the tracking object, and the contour image of the image frame is to be generated. The background image 64 is a still image only including the background without the tracking object and may be shot by a user immediately before shooting the moving image of the tracking object, for example, to be stored in the image storage unit 24. Alternatively, a user may select the background image 64 from among images captured in the past or template images prepared beforehand, according to the actual background. The contour image generator 22 updates the background image 64 according to the situation, as will be described later.

The edge extracting unit 66 reads the input image 62 from the image storage unit 24 to extract edges therefrom and generate an edge image. For example, the edge extracting unit 66 smoothes the input image 62 using a smoothing filter, such as a Gaussian filter, a median filter, a simple averaging filter, and a low-pass filter, before extracting edges using an edge extraction filter, such as a Laplacian filter, a Sobel filter, and a Canny edge filter.

The foreground processing unit 68 generates a foreground image by extracting the foreground by means of a background subtraction method using the input image 62 and background image 64. Further, the foreground processing unit 68 expands the foreground using an 8-neighbor dilation filter or the like. From the expanded foreground image thus generated, the foreground processing unit 68 extracts a boundary of the expanded foreground region to generate a foreground boundary image. The amount of expansion of the foreground is specified in advance.

The mask unit 70 masks the edge image generated by the edge extracting unit 66 using the expanded foreground image generated by the foreground processing unit 68. More specifically, by performing the logical AND between each pixel of the expanded foreground image and each pixel of the edge image, the mask unit 70 generates a masked edge image in which, among the edges in the edge image, edges included in regions other than the expanded foreground region are invalidated. Through such a masking process, unnecessary edges included in the background can be eliminated. In addition, since the expanded foreground image used in the masking is generated by expanding the foreground by the foreground processing unit 68, it is less likely that the masking eliminates edges representing the contour of the tracking object in the edge image.

The synthesis unit 72 synthesizes the foreground boundary image generated by the foreground processing unit 68 and the masked edge image generated by the mask unit 70 so as to generate the final contour image. In the masked edge image, the contour of the tracking object is represented by edges. Meanwhile, the foreground boundary image shows such a line as obtained by expanding the contour of the tracking object outward by about one pixel. Accordingly, by synthesizing these images, the contour of the tracking object appears bolder than the contour represented by edges in the edge image or appears as a double line. Namely, the contour image obtained here emphatically shows the contour of the tracking object therein.

In the above description, the boundary of the expanded foreground region, which has been generated so that edges representing the contour are not eliminated by masking performed by the mask unit 70, is also used in the synthesis processing performed by the synthesis unit 72 to generate a contour image in which the contour is emphatically indicated. However, the image to be synthesized with the masked edge image by the synthesis unit 72 may be the image of the boundary of unexpanded foreground or may be the image of the boundary obtained by shrinking the foreground. The latter case provides the same function as the case of the expanded foreground, and, in the former case, the contour in the edge image can be somewhat different from the boundary of the foreground; accordingly, the contour in the final contour image will be emphasized in any case.

The output unit 74 outputs the data of a contour image generated by the synthesis unit 72 to the image storage unit 24, etc. If the foreground extraction is not appropriately performed by the foreground processing unit 68, the output unit 74 will output an edge image generated by the edge extracting unit 66 as the contour image, as will be described later.

Figure 7:
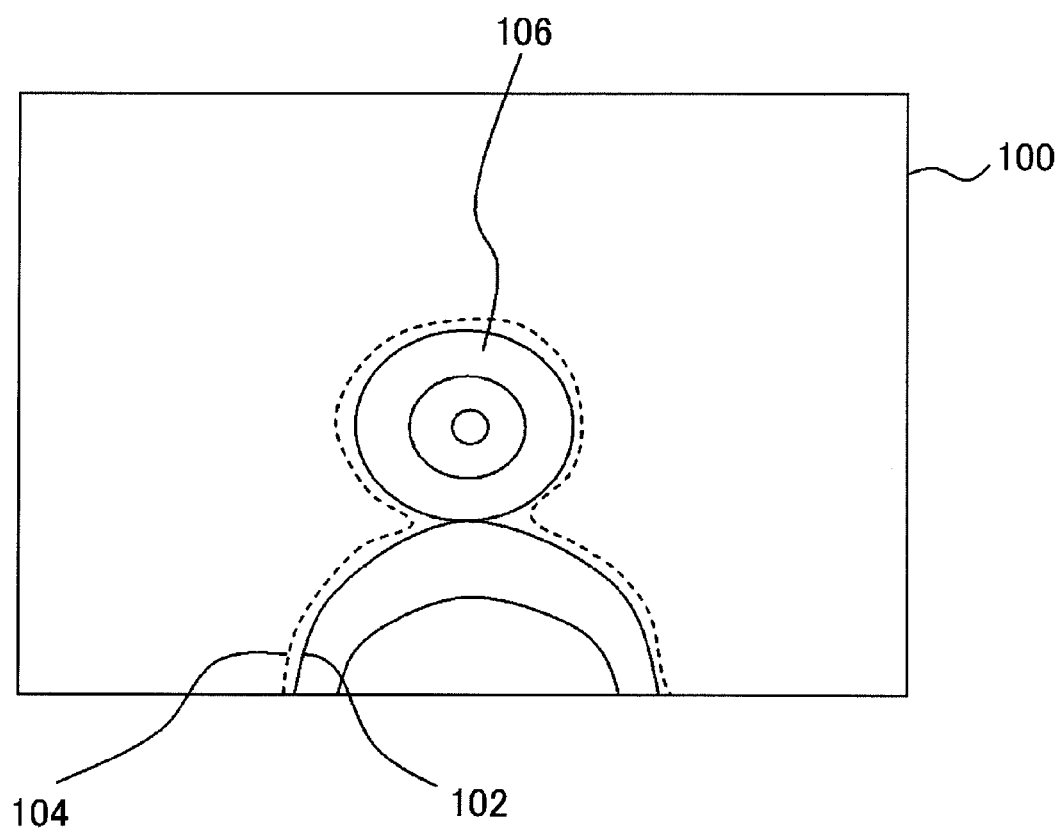
FIG. 7 is a diagram that schematically shows a configuration of a contour image in the present embodiment.

FIG. 7 schematically shows a configuration of a contour image. In a contour image 100, a solid line 102 indicates edges representing the contour of a tracking object 106 among edges in a masked edge image. Meanwhile, a dotted line 104 indicates the boundary of an expanded foreground region. The boundary of the unexpanded foreground region should almost overlap with the edges indicated by the solid line 102. However, by expanding the foreground, the dotted line 104 does not completely overlap with the solid line 102, so that the deletion of the solid line 102 is less likely to occur in the masking of the edge image. In addition, the solid line 102 and dotted line 104 form a double line, thereby emphasizing the contour of the tracking object 106.

The description now returns to FIG. 6. Upon detection of the state where the foreground processing unit 68 cannot appropriately extract the foreground, the background image update unit 76 acquires a new background image and updates the background image 64 stored in the image storage unit 24 therewith. The processing performed by the foreground processing unit 68 to generate a foreground image is background subtraction by which regions where a difference occurs between the background image 64 and input image 62 are extracted as the foreground. Accordingly, if the actual background differs from the background image 64 because of a change in the ambient brightness, in an object placed behind the tracking object, or in the shooting position, the whole image will be extracted as differences and the background subtraction will collapse. Therefore, when background subtraction is used to extract the contour of an object in successive frames of a moving image, appropriate consideration should be given to the shooting conditions.

Since the contour image generator 22 of the present embodiment is provided with the edge extracting unit 66 and foreground processing unit 68 as means for extracting contours, at least the contour of the tracking object will be extracted by the edge extracting unit 66 even if the background subtraction in the foreground processing unit 68 collapses. Accordingly, when there occurs a change of the shooting conditions that collapses background subtraction, the background image update unit 76 detects the collapse according to the size of the foreground region, etc. and updates the background image 64 while the edge extracting unit 66 continues to generate an edge image.

More specifically, the background image update unit 76 reads, from the image storage unit 24, image frames of the moving image most recently captured for a certain period of time to acquire inter-frame differences. When detecting successive image frames between which no difference is found, the background image update unit 76 determines that the image frames only include a background image in which the tracking object, which should move, is absent. Accordingly, the background image update unit 76 updates the background image 64 in the image storage unit 24 with the acquired image as a new background image. Alternatively, on a read image frame may be performed face detection or pattern matching with the shape of the tracking object, and, if a face or pattern considered to belong to the tracking object is not detected, the image of the image frame may be regarded as a background image. When a tracking object being shot by the image pickup apparatus 12 is tracked in real time, the background image update unit 76 may notify the user of the necessity of updating the background image 64 and may prompt the user to shoot anew the background image without the tracking object.

Figure 8:
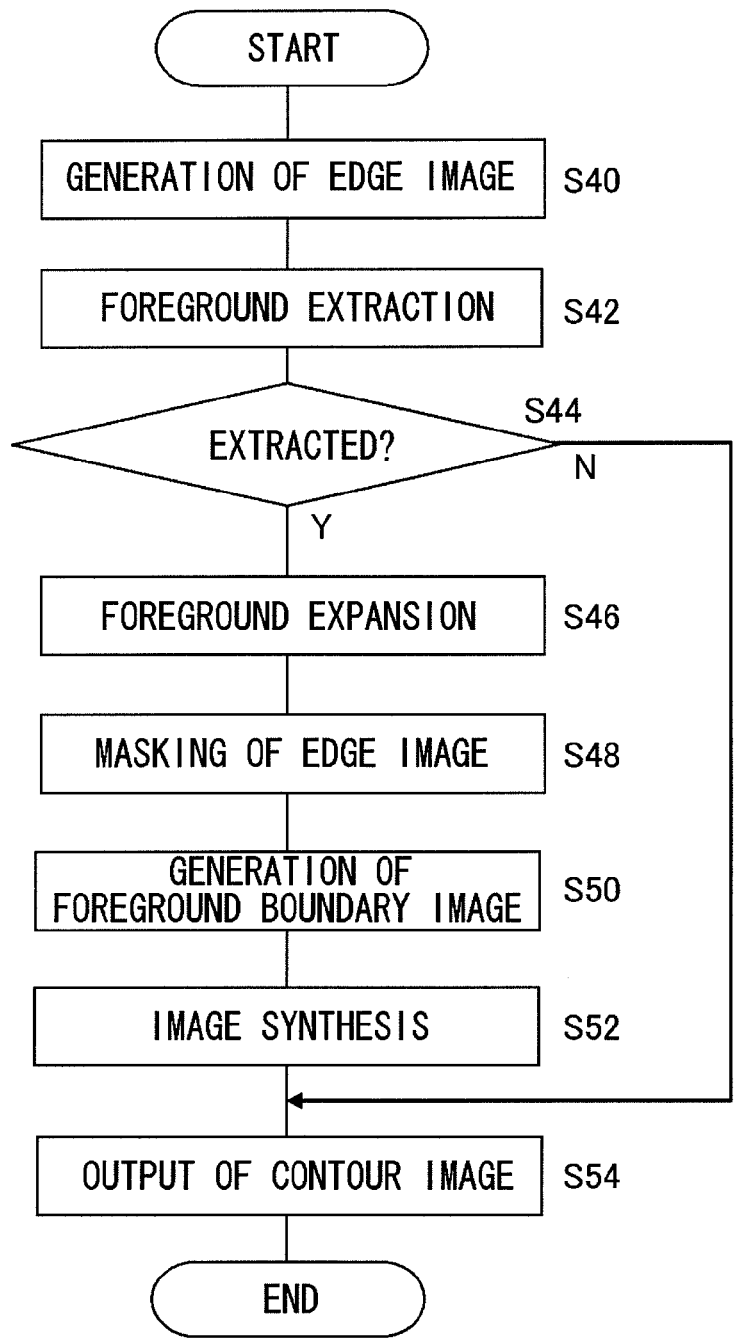
FIG. 8 is a flowchart that shows a procedure according to which the contour image generator generates a contour image of an input image in the present embodiment.

FIG. 8 is a flowchart that shows a procedure according to which the contour image generator 22 generates a contour image of an input image 62. The flowchart shows processing for one frame of the input image 62, and, in the tracking process, the same processing is repeated for successive image frames. Also, although the flowchart shows serial processing in which processes are serially performed, a process that can be performed without waiting for the completion of the previous process may be naturally performed in parallel or the processing order may be reversed.

First, the edge extracting unit 66 extracts edges from the input image 62 to generate an edge image (S40). In parallel, the foreground processing unit 68 acquires a difference in background of the input image 62 using a background image 64 to extract the foreground and generates a foreground image (S42). If it is determined that an appropriate foreground has been extracted based on the size thereof, etc. (Y at S44), the foreground processing unit 68 will expand the foreground and generate an expanded foreground image (S46).

Next, the mask unit 70 masks the edge image generated at S40 using the expanded foreground image generated at S46 so as to generate a masked edge image (S48). Meanwhile, the foreground processing unit 68 extracts a boundary of the expanded foreground in the expanded foreground image generated at S46 to generate a foreground boundary image (S50). Subsequently, the synthesis unit 72 synthesizes the masked edge image generated at S48 and the foreground boundary image generated at S50 (S52), and the output unit 74 outputs the resulting image to the image storage unit 24, etc. as a contour image (S54). If it is determined that an appropriate foreground has not been extracted at S44 (N at S44), the output unit 74 will output the edge image generated at S40 as a contour image (S54). More specifically, the edge extracting unit 66 acquires error information from the foreground processing unit 68 and transmits to the output unit 74 an edge image that the unit 68 itself has generated, so that the edge image is output as a contour image.

Although it is not shown in FIG. 8, when the foreground has not been extracted, the background image update unit 76 times updating of the background image 64 as described previously, in parallel with the generation of the edge image at S40 and the outputting of the contour image at S54.

Figure 9:
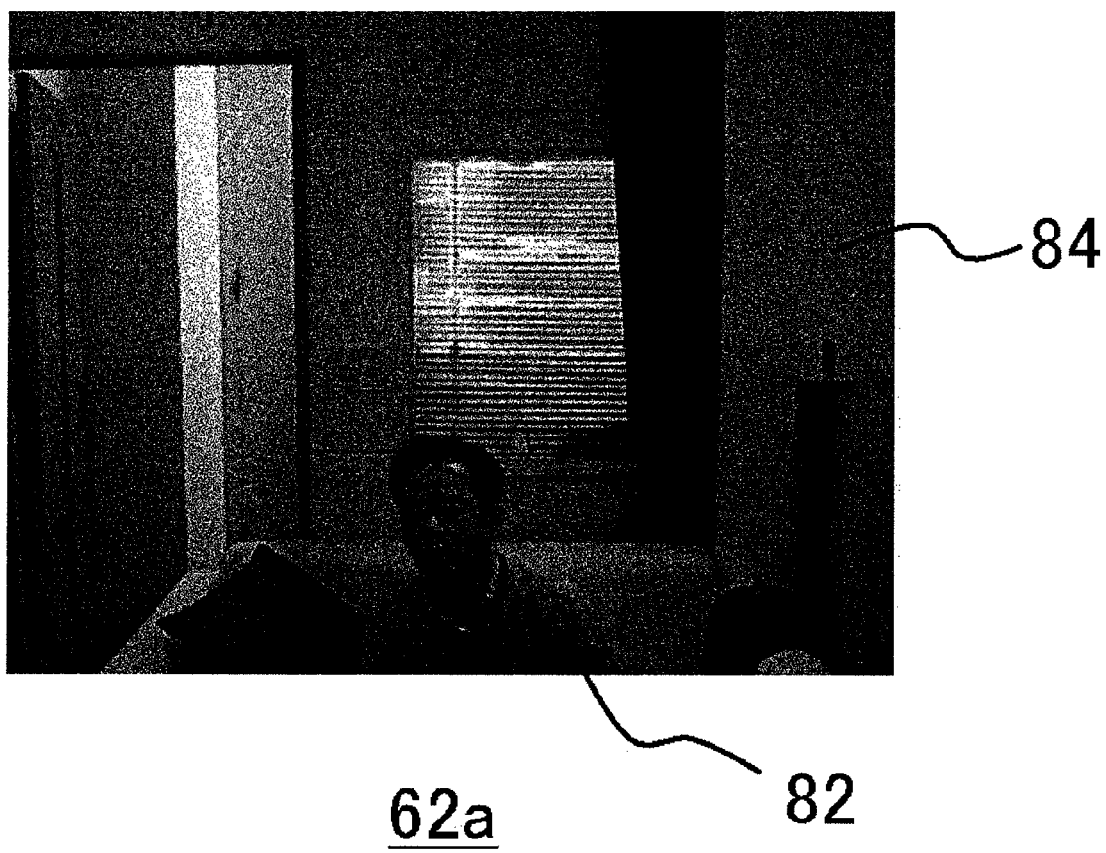
FIG. 9 shows an example of an input image of which the contour image is to be generated in the present embodiment.
Figure 10:
FIG. 10 shows an example of a background image used for background subtraction in the present embodiment.
Figure 11:
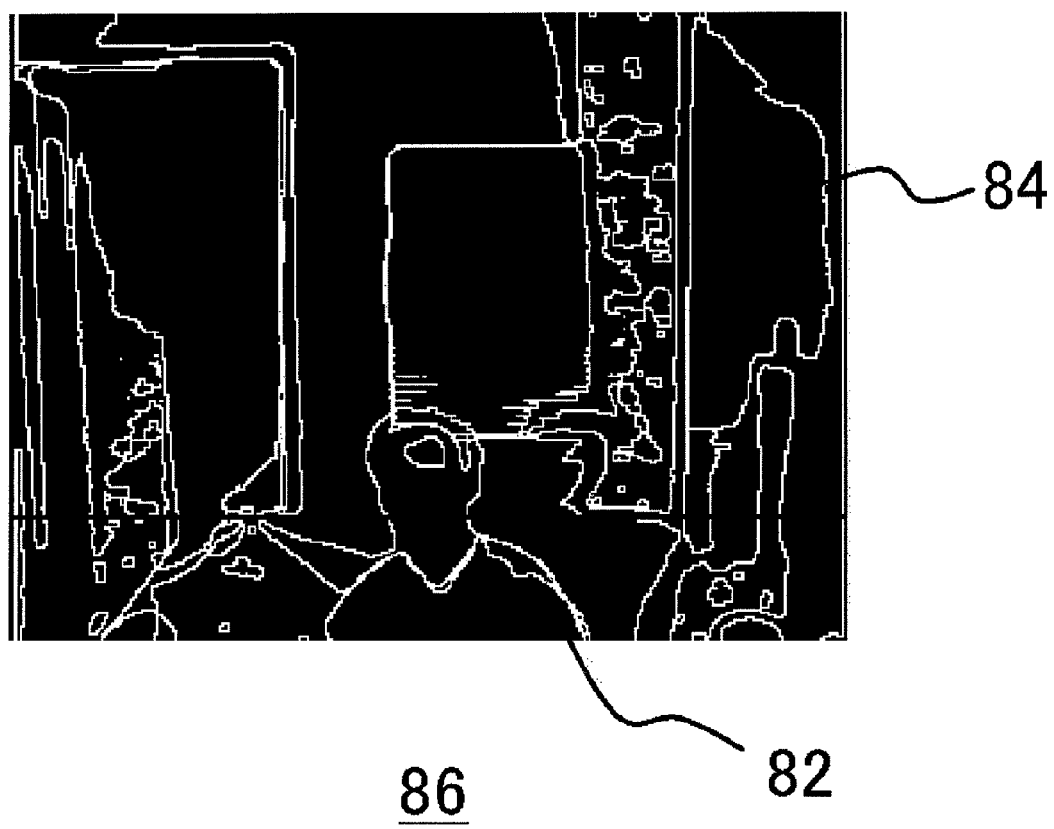
FIG. 11 shows an example of an edge image generated at the step S40 in FIG. 8.

In the following, an illustrative image at each process in the above-described processing for generating a contour image will be described. FIG. 9 shows an example of an input image of which the contour image is to be generated. In an input image 62a, a person 82 appears as the tracking object in front of the background 84. FIG. 10 shows an example of a background image used for background subtraction. A background image 64a corresponds to the input image 62a in which the person 82 is absent. FIG. 11 shows an example of an edge image generated at the step S40 in FIG. 8. An edge image 86 consists of edges included in the person 82 and edges included in the background 84. If the likelihood is observed using such an edge image 86, since the contour of the person 82 cannot be distinguished from edges included in the background 84, the likelihood will be inappropriately increased as a result of matching with the edges in the background and the accuracy of the tracking will be possibly reduced.

Figure 12:
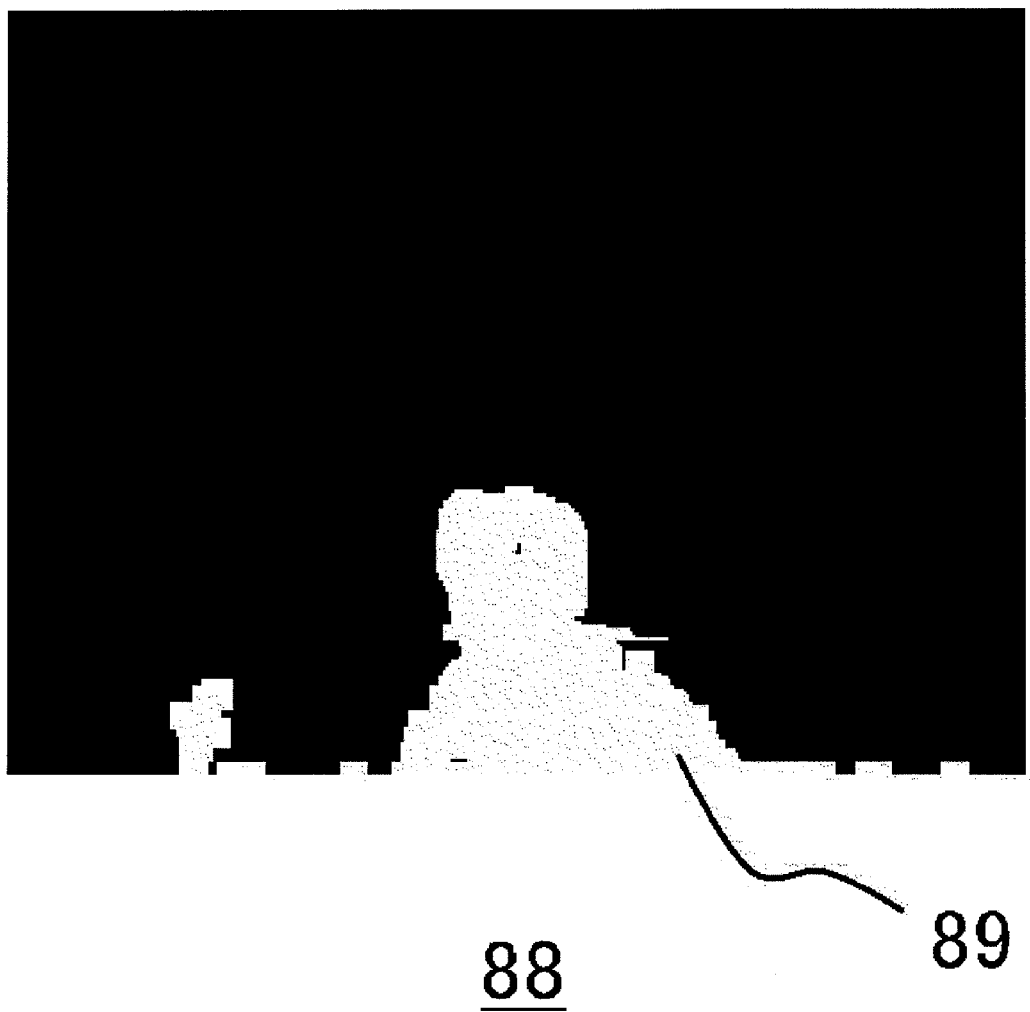
FIG. 12 shows an example of a foreground image generated at the step S42 in FIG. 8.
Figure 13:
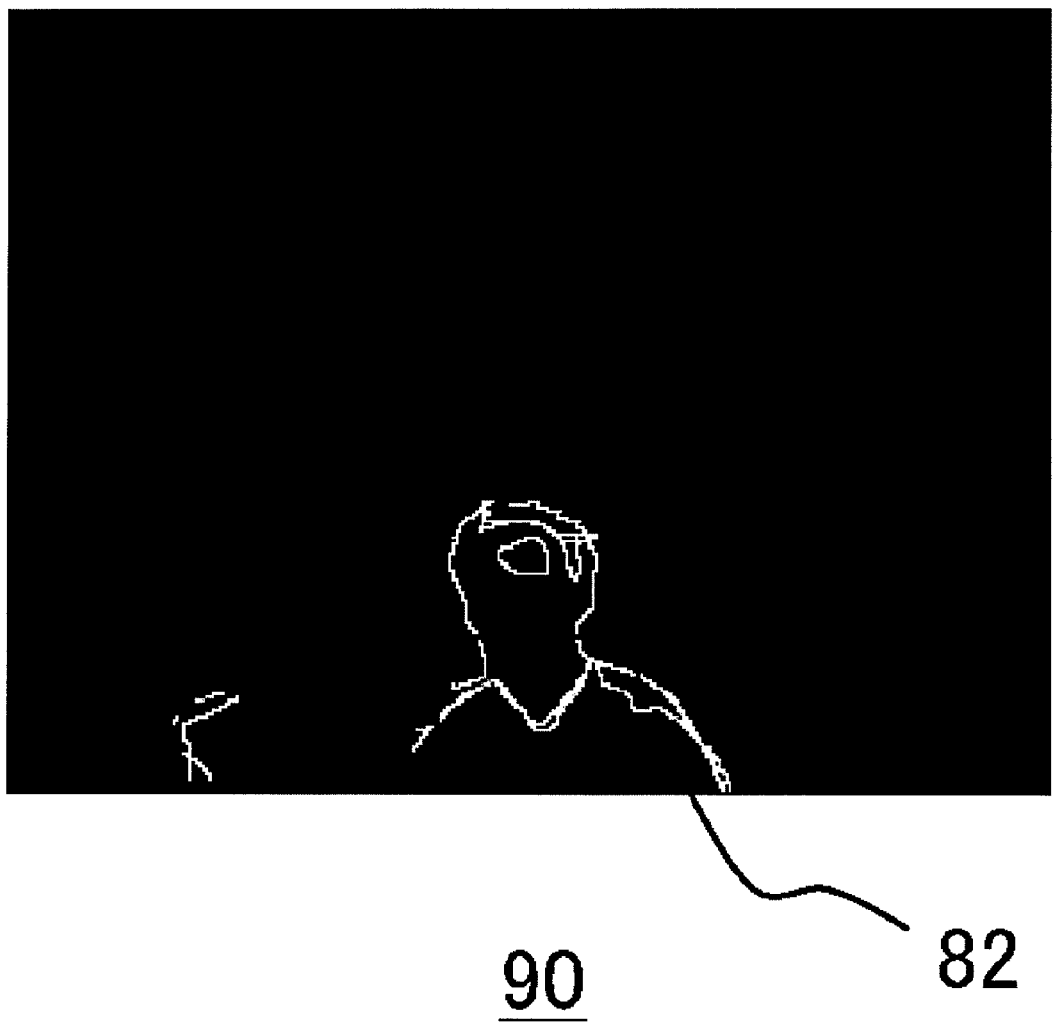
FIG. 13 shows an example of a masked edge image generated at the step S48 in FIG. 8.

FIG. 12 shows an example of an expanded foreground image generated at the step S46 in FIG. 8. In an expanded foreground image 88, only a region 89, which is obtained by expanding the region of the person 82 extracted as the foreground, has pixel values. FIG. 13 shows an example of a masked edge image generated at the step S48 in FIG. 8. A masked edge image 90 corresponds to the edge image 86 shown in FIG. 11 in which the region of the background 84 except the expanded part of the foreground does not have pixel values. Since masking is performed using the expanded foreground image, edges forming the contour of the person 82 have not been eliminated.

Figure 14:
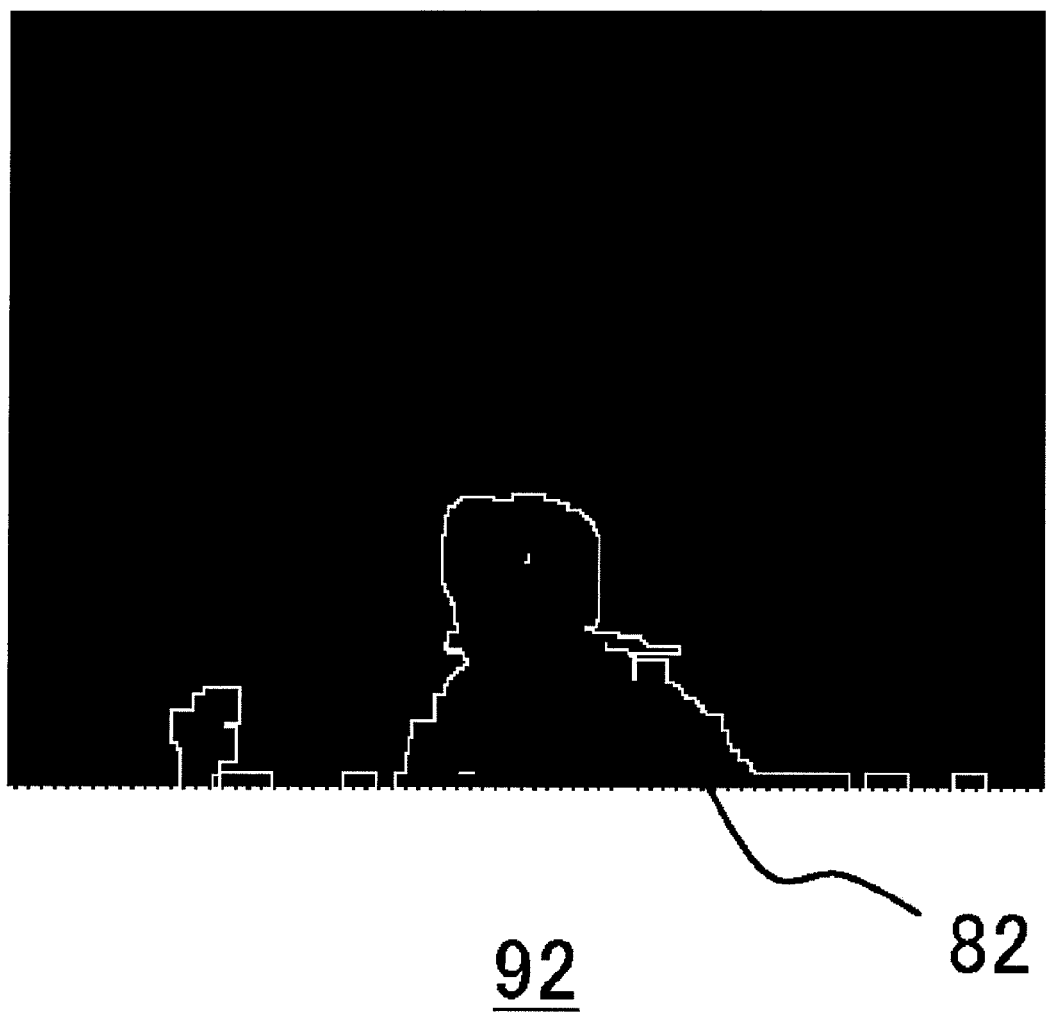
FIG. 14 shows an example of a foreground boundary image generated at the step S50 in FIG. 8.
Figure 15:
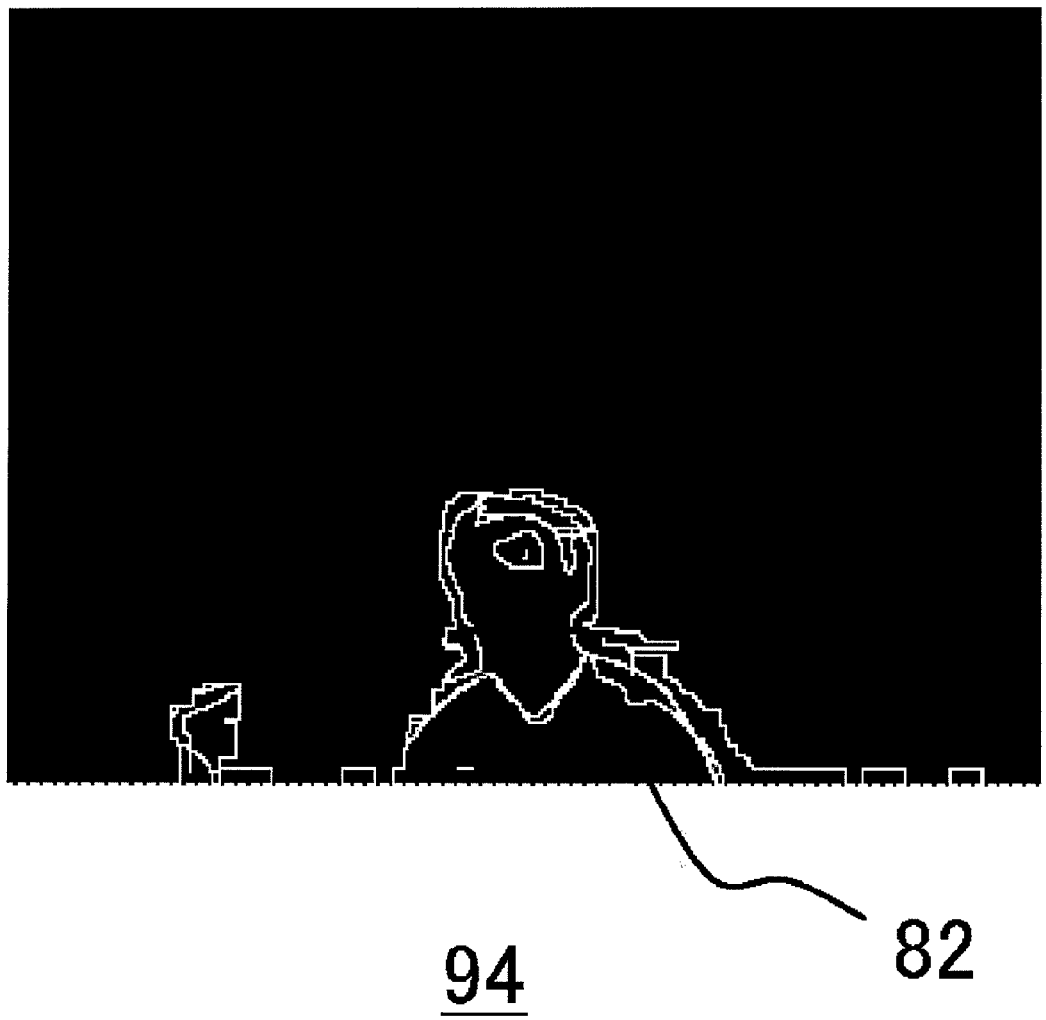
FIG. 15 shows an example of a contour image generated at the step S52 and output at the step S54 in FIG. 8.

FIG. 14 shows an example of a foreground boundary image generated at the step S50 in FIG. 8. A foreground boundary image 92 shows the boundary between the expanded foreground and the other region, and the boundary almost forms the contour of the person 82 although there is a slight difference due to the expansion. FIG. 15 shows a contour image generated at the step S52 and output at the step S54 in FIG. 8. In a contour image 94, the edge line obtained through edge extraction and the boundary of the expanded foreground region appear as a double line representing the contour of the person 82. If the likelihood is observed using such a contour image 94, the likelihood of a candidate curve close to the contour will be increased, thereby improving the accuracy of the tracking.

The above example describes the case where an edge image is output as a contour image when background subtraction collapses. However, if the edge extraction cannot be appropriately performed by the edge extracting unit 66 for any cause, an image constructed of the boundary of a foreground region extracted by the foreground processing unit 68 may be output as a contour image. In this case, when acquiring, from the edge extracting unit 66, error information or information indicating that edge density in the generated edge image falls outside a predetermined appropriate range, the foreground processing unit 68 may transmit the image of the boundary of the foreground region to the output unit 74 so that the image will be output.

According to the present embodiment described above, in visual tracking using a particle filter, a contour image featuring the contour of a tracking object is used for the observation of likelihood, instead of a simple edge image. More specifically, foreground extraction by means of background subtraction is performed in parallel with edge extraction, and the results therefrom are integrated. By extracting the contour through such two different methods, the reliability of the contour is improved and, in addition, it can be prevented that the whole process of contour image generation is stopped even if a problem arises in either of the methods, such as collapse of background subtraction due to a change of the shooting conditions. Accordingly, especially when tracking is performed in real time concurrently with image shooting, the tracking can be continued without impairing the performance of the real-time processing. Also, since a background image can be updated while a contour image is generated through edge extraction, a tracking apparatus tolerant of a change of shooting conditions can be achieved.

Further, by masking an edge image using an image in which the foreground region is expanded, at least unnecessary edges included in the background region can be eliminated. In addition, by synthesizing a foreground boundary image constructed of the boundary of the expanded foreground region and the masked edge image, the contour part appears as a bold line or a double line. Accordingly, when the likelihood is observed, inappropriate increase of the likelihood caused by matching with edges other than the contour is less likely to occur, and a candidate curve near the contour is highly likely to be matched with the contour, and hence, the likelihood of such a candidate curve is increased. As a result, the reliability of the likelihood is increased, and the accuracy of the tracking process is also improved.

The present invention has been described with reference to the embodiment. The embodiment is intended to be illustrative only, and it will be obvious to those skilled in the art that various modifications to constituting elements or processes could be developed and that such modifications also fall within the scope of the present invention.

For example, the contour image generator 22 may be provided in an image processing apparatus other than the tracking apparatus 14. The contour image generator 22 may be provided in an automatic photo-taking apparatus, for example, and, after an image of a subject is once taken into the apparatus, the contour image generator 22 may generate a contour image of the subject. In this case, the position of the subject is computed using the contour image and such information is fed back into a control apparatus for controlling the orientation or position of the camera, and automatic adjustment is made so as to place the subject in the center or a desired position in the picture. Since a contour image with the contour therein emphasized can be stably generated also in such a case even if the ambient brightness or other shooting conditions change, the automatic adjustment can be performed with high accuracy.

REFERENCE SIGNS LIST 10 visual tracking system
12 image pickup apparatus
14 tracking apparatus
16 display apparatus
20 image acquiring unit
22 contour image generator
24 image storage unit
26 tracking process unit
28 tracking start/end determining unit
29 sampling unit
30 observing unit
34 result acquiring unit
36 result storage unit
40 output control unit
66 edge extracting unit
68 foreground processing unit
70 mask unit
72 synthesis unit
74 output unit
76 background image update unit

INDUSTRIAL APPLICABILITY

As discussed above, the present invention is applicable to information processors, such as visual tracking apparatuses, computers, gaming devices, image pickup apparatuses, moving image players, and automatic shooting apparatuses.

The invention claimed is:

1. An image processing apparatus for generating a contour image in which the contour of an object included in an input image is emphasized, the image processing apparatus comprising:
an edge extracting unit configured to extract edges from an input image to generate an edge image;
a foreground processing unit configured to acquire a difference in background of the input image using a background image registered in advance and to extract a foreground including an object;
a mask unit configured to generate a masked edge image obtained by eliminating, from an edge image generated by the edge extracting unit, edges in a region other than a foreground region specified by a foreground extracted by the foreground processing unit;
a synthesis unit configured to synthesize the masked edge image generated by the mask unit and a foreground boundary image constructed of the boundary of a foreground region specified by a foreground extracted by the foreground processing unit so as to generate the contour image; and
an output unit configured to output the contour image.

2. The image processing apparatus of claim 1, wherein the mask unit uses a region obtained by expanding, by a predetermined amount, a foreground extracted by the foreground processing unit as the foreground region.

3. The image processing apparatus of claim 2, wherein the synthesis unit uses a region obtained by expanding, by a predetermined amount, a foreground extracted by the foreground processing unit as the foreground region.

4. The image processing apparatus of claim 1, wherein the synthesis unit uses a region obtained by expanding, by a predetermined amount, a foreground extracted by the foreground processing unit as the foreground region.

5. The image processing apparatus of claim 1, wherein:
the foreground processing unit determines that an appropriate foreground has not been extracted from an input image, in accordance with a predetermined criterion; and,
when the foreground processing unit determines that an appropriate foreground has not been extracted, the output unit outputs an edge image generated by the edge extracting unit as the contour image.

6. The image processing apparatus of claim 5, wherein the input image is an image frame of a moving image, the image processing apparatus further comprising
a background image update unit configured to acquire, when the foreground processing unit determines that an appropriate foreground has not been extracted, an inter-frame difference between a plurality of image frames included in a moving image so to detect an image frame that does not include an object, and to update the registered background image with the detected image frame.

7. The image processing apparatus of claim 5, further comprising a background image update unit configured to, when the foreground processing unit determines that an appropriate foreground has not been extracted, notify a user of the necessity of updating the background image and update the registered background image with an image newly acquired by the user.

8. The image processing apparatus of claim 1, wherein:
the foreground processing unit determines that an appropriate edge image has not been generated by the edge extracting unit, in accordance with a predetermined criterion; and,
when the foreground processing unit determines that an appropriate edge image has not been generated, the output unit outputs the foreground boundary image as the contour image.

9. The image processing apparatus of claim 1, wherein the foreground processing unit accepts a user's input for selecting a template image from among a plurality of template images acquired in advance and registers the selected template image as the background image.

10. An object tracking apparatus, comprising:
a candidate contour determining unit configured to determine a candidate contour of an object to be tracked in a second image frame on the basis of an estimated existence probability distribution of the object in a first image frame, the first image frame and the second image frame being included in an image stream constituting the data of a moving image including the object to be tracked;

an observing unit configured to observe the likelihood of a candidate contour determined by the candidate contour determining unit by performing matching between the candidate contour and a contour image of the second image frame output by the image processing apparatus of claim 1; and a tracking result acquiring unit configured to estimate the existence probability distribution of the object in the second image frame on the basis of the likelihood observed by the observing unit.

11. An image processing method according to which a computer generates a contour image in which the contour of an object included in an input image is emphasized, the image processing method comprising:

reading an input image stored in memory and extracting edges from the input image to generate an edge image;

reading a background image stored in memory and acquiring a difference in background of the input image using the background image to extract a foreground including an object;

generating a masked edge image obtained by eliminating, from the edge image, edges in a region other than a foreground region specified by the foreground; and outputting, as the contour image, an image obtained by synthesizing the masked edge image and a foreground boundary image constructed of the boundary of a foreground region specified by the extracted foreground.

12. The image processing method of claim 11, wherein the foreground region is the region of an expanded foreground obtained by expanding the foreground by a predetermined amount.

13. A non-transitory computer-readable medium with a computer program product embedded thereon, the computer program product provided to generate a contour image in which the contour of an object included in an input image is emphasized and comprising:

a module configured to read an input image stored in memory and extract edges from the input image to generate an edge image;

a module configured to read a background image stored in memory and acquire a difference in background of the input image using the background image to extract a foreground including an object;

a module to generate a masked edge image obtained by eliminating, from the edge image, edges in a region other than a foreground region specified by the foreground; and a module configured to output, as the contour image, an image obtained by synthesizing the masked image and a foreground boundary image constructed of the boundary of a foreground region specified by the extracted.

* * * * *